US011897263B2

(12) United States Patent
Foresti et al.

(10) Patent No.: US 11,897,263 B2
(45) Date of Patent: Feb. 13, 2024

(54) SUBWAVELENGTH RESONATOR FOR ACOUSTOPHORETIC PRINTING (71) Applicant: President and Fellows of Harvard College, Cambridge, MA (US)

(72) Inventors: Daniele Foresti, Somerville, MA (US); Aleksandra Markovic, Belgrade (RS); Jennifer A. Lewis, Cambridge, MA (US)

(73) Assignee: PRESIDENT AND FELLOWS OF HARVARD COLLEGE, Cambridge, MA (US)

( * ) Notice: Subject to any disclaimer, the term of this patent is extended or adjusted under 35 U.S.C. 154(b) by 320 days.

(21) Appl. No.: 17/442,979

(22) PCT Filed: Mar. 23, 2020

(86) PCT No.: PCT/US2020/024140
§ 371 (c)(1),
(2) Date: Sep. 24, 2021

(87) PCT Pub. No.: WO2020/205301
PCT Pub. Date: Oct. 8, 2020

(65) Prior Publication Data
US 2022/0176694 A1 Jun. 9, 2022

Related U.S. Application Data (60) Provisional application No. 62/826,436, filed on Mar. 29, 2019.

(51) Int. Cl.
*B41J 2/14* (2006.01)
(52) U.S. Cl.
CPC .................. *B41J 2/14008* (2013.01)

(58) Field of Classification Search
CPC .... B41J 2/14008; B41J 2/135; B22F 2999/00; Y02P 10/25; B33Y 10/00; B33Y 30/00; B33Y 80/00; B29C 64/112; B29C 64/209
See application file for complete search history.

(56) References Cited

U.S. PATENT DOCUMENTS 5,260,665 A   11/1993   Goldberg et al.
5,880,759 A    3/1999   Silverbrook
(Continued)

FOREIGN PATENT DOCUMENTS

WO   WO 2014/029505 A1   2/2014
WO   WO 2015/110600 A1   7/2015
WO   WO 2018/022513 A1   2/2018

OTHER PUBLICATIONS

International Search Report and Written Opinion for PCT/US2020/024140, dated Jun. 18, 2020, 18 pp.
(Continued)

*Primary Examiner* — Bradley W Thies
(74) *Attorney, Agent, or Firm* — Crowell & Moring LLP (57) ABSTRACT

A subwavelength resonator for acoustophoretic printing comprises a hollow resonator body for local enhancement of an acoustic field integrated with a nozzle body for delivery of an ink into the acoustic field. The nozzle body has a first end outside the hollow resonator body and a second end inside the hollow resonator body, and includes a fluid channel extending between a fluid inlet at the first end and a fluid outlet at the second end. The fluid channel passes through a side wall of the hollow resonator body and includes at least one bend. During acoustophoretic printing, an ink delivered through the fluid channel of the nozzle body and out of the fluid outlet is exposed to a high-intensity acoustic field.

20 Claims, 6 Drawing Sheets

(56) References Cited

U.S. PATENT DOCUMENTS

| | | | |
|---|---|---|---|
| 6,003,388 | A | 12/1999 | Oeftering |
| 6,422,690 | B1 | 7/2002 | Harvey et al. |
| 7,354,141 | B2 | 4/2008 | Elison et al. |
| 9,878,536 | B2 | 1/2018 | Foresti et al. |
| 10,214,013 | B2 * | 2/2019 | Foresti .................. B33Y 10/00 |
| 2006/0144871 | A1 | 7/2006 | Van Tuyl et al. |
| 2006/0209129 | A1 | 9/2006 | Onozawa |
| 2009/0115820 | A1 | 5/2009 | Nomura et al. |
| 2013/0233849 | A1 | 9/2013 | Saida et al. |

OTHER PUBLICATIONS

S. L. N. Ford, "Additive Manufacturing Technology: Potential Implications for U.S. Manufacturing Competitiveness," *Journal of International Commerce and Economics*, Sep. 2014, pp. 1-35.

J. Steele, "The Next Industrial Revolution: Functional Printing," *Printing News*, Apr. 1, 2014, pp. 1-5.

G. D. Martin and I. M. Hutchings, "Fundamentals of Ink Jet Technology," in *Inkjet Technology for Digital Fabrication*, First Edition, John Wiley & Sons (2013) pp. 21-44.

P.K. Kundu, I. M. Cohen and D. R. Dowling, "Conservation Laws," in *Fluid Mechanics*, Elsevier, Inc. (2012) pp. 95-169.

N. Bjelobrk et al., "Contactless transport of acoustically levitated particles," *Applied Physics Letters*, 97 (2010) pp. 161904-1-161904-3.

V. Vandaele et al., "Non-contact handling in microassembly: Acoustical levitation," *Precision Engineering*, 29 (2006) pp. 491-505.

E. H. Brandt, "Levitation in Physics," *Science*, 243 (1989) pp. 349-355.

H. Azhari, "Waves—A General Description," in *Basics of Biomedical Ultrasound for Engineers*, John Wiley & Sons, Inc. (2010) pp. 9-33.

L. V. King, "On the Acoustic Radiation of Pressure on Spheres," *Proceedings of the Royal Society of London*, 147 (1934) p. 212.

D. Foresti et al., "Contactless transport of matter in the first five resonance modes of a line-focused acoustic manipulator," *J. Acoust. Soc. Am.*, 131, 2 (2012) pp. 1029-1038.

J. Christensen et al., "Theory of Resonant Acoustic Transmission through Subwavelength Apertures," *Physical Review Letters*, 101 (2008) pp. 014301-1-014301-4.

B. Hou "Tuning Fabry-Perot resonances via diffraction evanescent waves," *Physical Review B*, 76 (2007) pp. 054303-1-054303-054303-6.

J. Renner et al., "Reproducibility of DoD Inkjet Printing Systems," 38th International Research Conference, Advances in Printing and Media Technology, Budapest, 2011, pp. 1-8.

D. Foresti et al., "Investigation of a line-focused acoustic levitation for contactless transport of particles," *Journal of Applied Physics*, 109 (2011) pp. 0935503-1-0935503-11.

S. Zhao and J. Wallaschek, "A standing wave acoustic levitation system for large planar objects," *Arch. Appl. Mech*, vol. 81, 2011, pp. 123-129.

D. Foresti and D. Poulikakos, "Acoustophoretic contactless elevation, orbital transport and spinning of matter in air," *Physical Review Letters*, 112 (2014) pp. 024301-024301-5.

S. Baer, "Analysis of the particle stability in a new designed ultrasonic levitation device," *Review of Scientific Instruments*, 82 (2011) pp. 105111-1-105111-7.

A. L. Yarin et al., "On the acoustic levitation of droplets," *Journal of Fluid Mechanics*, 356 (1998) pp. 65-91.

Y. Wu, "Development of Free Adjustable Function Generator for Drop-on-Demand Droplets Generation," in *Advances in Intelligent and Soft Computing*, 160, Springer-Verlag (2012) pp. 477-481.

M. Vaezi et al., "A review on 3D micro-additive manufacturing technologies," *Int. Journal of Adv. Manuf. Technol.*, 67 (2012) pp. 1721-1754.

Y. Kim et al., "Design and Fabrication of Electrostatic Inkjet Head using Silicon Micromachining Technology," *Journal of Semiconductor Technology and Science*, 8 (2008) pp. 121-127.

S. Lee et al., "Electrostatic droplet formation and ejection of colloid," *Micro-Nanomechatronis and Human Science*, (2004) pp. 1-6.

M. Colina et al., "Laser-induced forward transfer of liquids: Study of the droplet ejection process," *Journal of Applied Physics*, 99 (2006) pp. 084909-1-084909-7.

P. Galliker et al., "Direct printing of nanostructures by electrostatic autofocussing of ink nanodroplets," *Nature Communications* 3, 890 (2012) pp. 1-9.

* cited by examiner

SUBWAVELENGTH RESONATOR FOR ACOUSTOPHORETIC PRINTING

RELATED APPLICATIONS

The present patent document is the national stage of International Patent Application No. PCT/US2020/024140, which was filed on Mar. 23, 2020, and claims the benefit of priority to U.S. Provisional Patent Application No. 62/826,436, which was filed on Mar. 29, 2019. Both of the aforementioned applications are hereby incorporated by reference in their entirety.

TECHNICAL FIELD

The present disclosure is related generally to droplet generation 2D and 3D printing technology and more specifically to acoustophoretic printing.

BACKGROUND

Due to the limitations of state-of-the-art 2D and 3D printing methods, inks are often engineered to have physical properties satisfying the requirements of existing printers. A typical approach to rendering materials printable is to use additives to adjust the rheological properties of the ink. While enhancing printability, such additives may act as impurities in or otherwise prove detrimental to the printed structure.

In the realm of droplet-based printing techniques, inkjet technology represents a standard in industry and research. Despite its wide usage, only a narrow window of materials having a suitable combination of properties (e.g., viscosity and surface tension) may be successfully ejected from an ink jet printhead. This limitation can be attributed to the droplet detachment mechanism, which is based on the Rayleigh-Plateau instability. In inkjet technologies, a substantial mechanical excitation of the ink may be required in order to break the meniscus and eject a defined volume of liquid. Such a dynamic process implies a strong coupling between interfacial and viscous forces.

Many inks of practical interest are based upon colloids or polymers that have relatively high viscosity and require dilution with additives for successful printing. Truly decoupling the dependence of the printing process from the physical properties of the ink may allow unprecedented freedom in the type and complexity of materials that can be 2D- and 3D-printed.

Acoustophoretic printing is an innovative approach for 2D- and 3D printing and may have application in a wide range of fields. The technology exploits the nonlinear effects of a subwavelength ultrasonic cavity to control droplet detachment from a nozzle by harnessing acoustic radiation pressure acting on the droplet. By exploiting Fabry-Perot acoustic resonances, it may be possible to generate an acoustic field that intrinsically outcouples the detached drop, create a highly localized acoustic field, which decouples the force from an underlying substrate, and enhance the acoustic force magnitude by more than one or two orders of magnitude compared to existing systems.

Prototypical acoustophoretic systems may employ nozzles fabricated manually and individually by capillary-pulling techniques. This approach may limit the print head to one nozzle or just a few nozzles per print head, thereby limiting its output, capabilities and scale-up. In addition, when compared to commercial inkjet techniques, the prototype may demonstrate lower resolution and lower throughput.

A description of preliminary work may be found in Foresti et al., "Acoustophoretic Printing Apparatus and Method," International Patent Publication No. WO 2015/110600 and in Foresti et al., "Apparatus and Method for Acoustophoretic Printing," International Patent Publication No. WO/2018/022513, both of which are hereby incorporated by reference in their entirety.

BRIEF SUMMARY

A subwavelength resonator for acoustophoretic printing comprises a hollow resonator body for local enhancement of an acoustic field integrated with a nozzle body for delivery of an ink into the acoustic field. The nozzle body has a first end outside the hollow resonator body and a second end inside the hollow resonator body, and includes a fluid channel extending between a fluid inlet at the first end and a fluid outlet at the second end. The fluid channel passes through a side wall of the hollow resonator body and includes at least one bend. During acoustophoretic printing, an ink delivered through the fluid channel of the nozzle body and out of the fluid outlet is exposed to a high-intensity acoustic field.

A method of acoustophoretic printing comprises providing an apparatus including an acoustic emitter and a subwavelength resonator, where the subwavelength resonator includes a hollow resonator body and a nozzle body integrated with the hollow resonator body. The nozzle body has a first end outside the hollow resonator body and a second end inside the hollow resonator body, and includes a fluid channel extending between a fluid inlet at the first end and a fluid outlet at the second end. The fluid channel passes through a side wall of the hollow resonator body and includes at least one bend. The method further includes activating the acoustic emitter to generate an acoustic field. The acoustic field is transmitted to the subwavelength resonator and enhanced in the hollow resonator body, such that a high intensity acoustic field is formed at the fluid outlet. An ink is delivered through the fluid channel to the fluid outlet and a predetermined volume of the ink is detached from the nozzle body in the high intensity acoustic field.

BRIEF DESCRIPTION OF THE DRAWINGS

In FIGS. 1A and 1B, the hollow resonator body and the nozzle body are assembled together, and in FIGS. 1C and 1D, the hollow resonator body and the nozzle body are integrally formed.

DETAILED DESCRIPTION

The present disclosure introduces a new nozzle design for acoustophoretic print heads that may be implemented using microfabrication techniques. This significant shift in the approach to nozzle manufacturing may allow for significant improvements in deposition resolution as well as throughput, paving the way for a highly functional, multi-material, high-throughput drop-on-demand droplet generation technique.

Figure 1A:
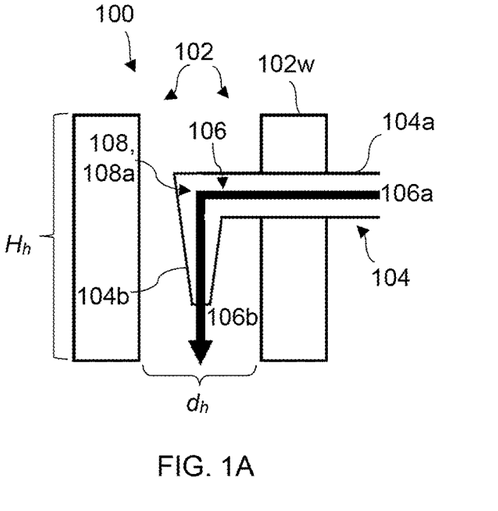
FIGS. 1A-1D are cross-sectional schematics of exemplary subwavelength resonators for acoustophoretic printing, where each resonator comprises a hollow resonator body integrated with a nozzle body.

Referring first to the cross-sectional schematic of FIG. 1A, a subwavelength resonator 100 for acoustophoretic printing comprises a hollow resonator body 102 for local enhancement of an acoustic field, and a nozzle body 104 integrated with the hollow resonator body 102 for delivery of an ink into the acoustic field. The hollow resonator body 102 and the nozzle body may be assembled together or may be integrally formed, as further discussed below. The nozzle body 104 has a first end 104a outside the hollow resonator body 102 and a second end 104b inside the hollow resonator body 102. The nozzle body 104 comprises a fluid channel 106 extending between a fluid inlet 106a at the first end 104a of the nozzle body 104 and a fluid outlet 106b at the second end 104b. The fluid channel 106 passes through a side wall 102w of the hollow resonator body 102 and includes at least one bend 108. Due to the geometry of the nozzle body 104 and its positioning with respect to the hollow resonator body 102, an ink delivered through the fluid channel 106 and out of the fluid outlet 106b is exposed to a high-intensity acoustic field. Thus, ink droplets of very small volumes may be detached at the fluid outlet 106b and exit the subwavelength resonator 100. As would be recognized by the skilled artisan, the nozzle body 104 of the subwavelength resonator 100 shown in FIGS. 1A-1D and other figures may have a first end 104a that extends beyond the length shown in the schematics, and may ultimately be connected to an ink source, e.g., via external tubing, for delivery of the ink into the fluid channel 106. In addition, the first end 104a may extend in any direction, as further discussed below.

Figure 2A:
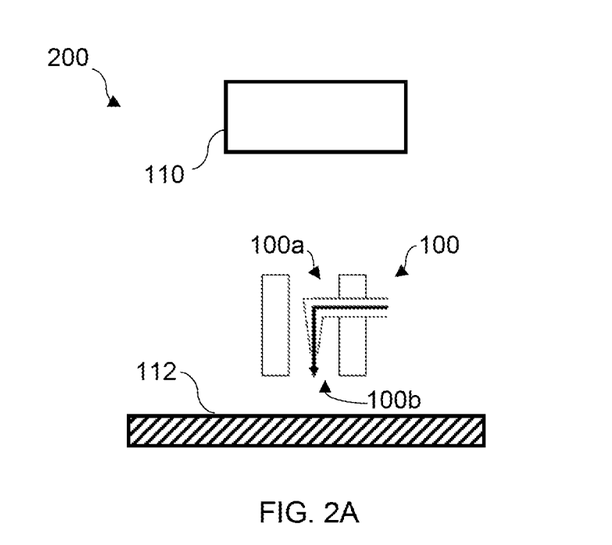
FIGS. 2A and 2B are cross-sectional schematics, each showing an exemplary apparatus for acoustophoretic printing.

When employed for acoustophoretic printing, the subwavelength resonator 100 may be part of an apparatus 200, as shown for example in FIG. 2A, that includes an acoustic emitter 110 for generating the acoustic field and a substrate 112 for deposition of the ink delivered through the fluid channel 106. The substrate 112 may be positioned adjacent to the fluid opening 106b of the nozzle body 104 to receive the ejected ink. During printing, the substrate 112 may be moved relative to the nozzle opening 112 in an x-, y-, and/or z-direction such that the ink droplets are deposited in a predetermined 2D or 3D pattern on the substrate 112. Suitable inks may include both Newtonian and non-Newtonian fluids, viscoelastic fluids, yield stress fluids, polymer solutions, hydrogels, colloids, emulsions and complex fluids in general with Z values spanning a wide range (e.g., $0.001 \leq Z \leq 1000$). The substrate 112 that receives the ink droplets may comprise a solid, liquid or gel.

The emitter 110 may comprise a piezoelectric transducer, a mechanical oscillator, a magnetostrictive oscillator or another source of sound waves. A longitudinal axis of the emitter 110 may be defined by the direction of the oscillations. A suitable driving frequency may be in the range from 1 kHz to 2 MHz, and more typically from 20 kHz to 250 kHz. At such a frequency, a resonant condition corresponding to a high acoustic pressure may be achieved in the subwavelength resonator 100.

Figure 2B:
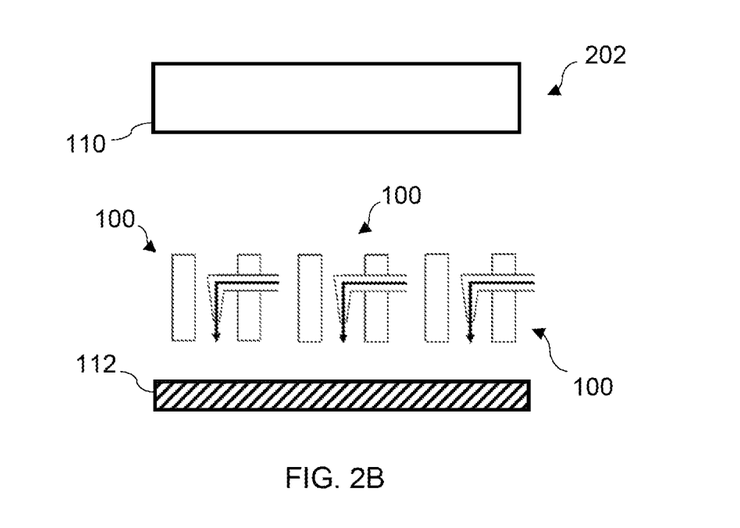
Figure 3:
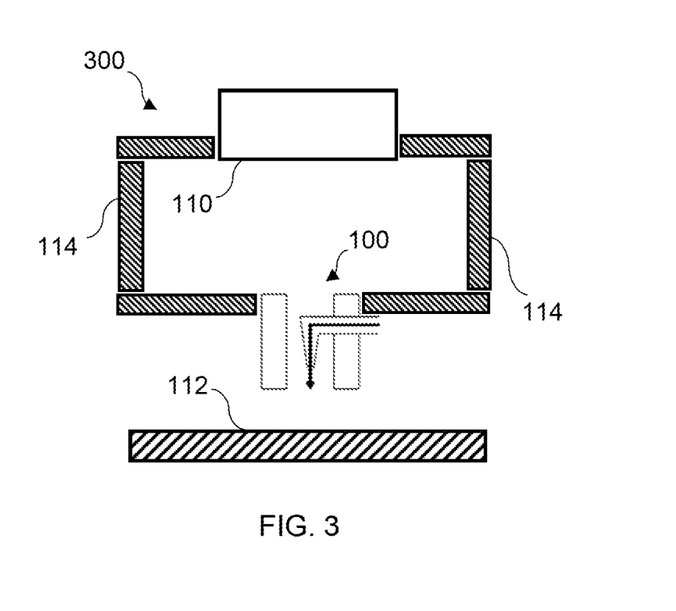
FIG. 3 is a cross-sectional schematic of an exemplary apparatus for acoustophoretic printing.
Figure 4:
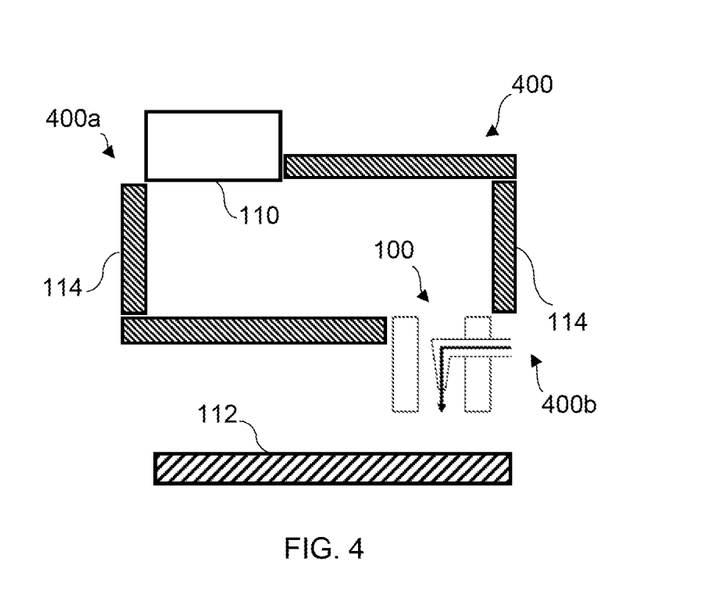
FIG. 4 is a cross-sectional schematic of an exemplary apparatus for acoustophoretic printing.

The apparatus 200 that includes the subwavelength resonator 100 may have any of a number of configurations. Generally speaking, the emitter 110 is disposed on an inlet side 100a of the subwavelength resonator 100 and the substrate 112 is disposed on an outlet side 100b of the subwavelength resonator 100, as shown in the schematic of FIG. 2A. The apparatus 202 may include a number of the subwavelength resonators 100, as shown in FIG. 2B and discussed below. In some examples, as shown in FIG. 3, the apparatus 300 may further comprise one or more sound reflecting walls 114 for transmission of the acoustic field between the emitter 110 and the subwavelength resonator 100. In the example of FIG. 4, the emitter 110 may be positioned at a first end 400a of the apparatus 400, and the subwavelength resonator 100 may be positioned at a second end 400b of the apparatus 400. It is noted that the schematics are not to scale, and any embodiment or configuration of the subwavelength resonator 100 (e.g., as shown in FIGS. 1A-1D and as described throughout the disclosure) may be incorporated into each apparatus 200,300,400 or into another apparatus having a different configuration.

Returning now to FIG. 1B, the fluid channel 106, which includes at least one bend 108 as shown in FIG. 1A, may include, in addition to a first bend 108a disposed in the hollow resonator body 102, a second bend 108b disposed outside the hollow resonator body 102 closer to the fluid inlet 106a than the first bend 108a. The first bend and/or the second bend 108a,108b may comprise a 90° angle, as illustrated. More generally speaking, the first and/or the second bend 108a,108b may comprise an angle in a range from 60° to 120° with respect to a longitudinal axis 116 of the nozzle body 104. Consequently, the first end 104a may also include a bend. Notably, the fluid inlet 106a, which is directed upward (about 90° from horizontal) in FIG. 1B, may alternatively be directed downward (about −90° from horizontal) or at some other angle ϑ with respect to the horizontal (e.g. $-120° \leq \vartheta \leq 120°$).

Figure 1B:
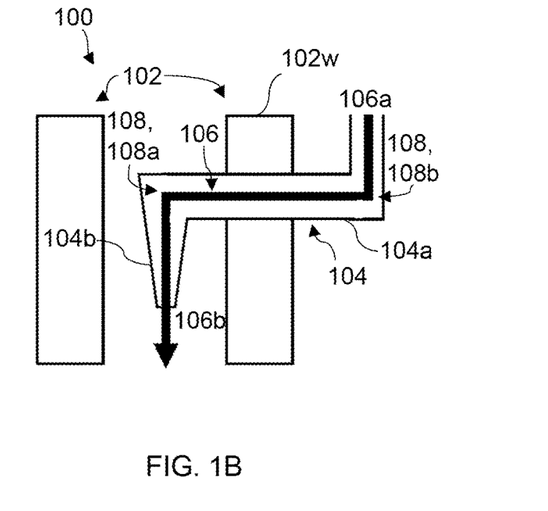

In examples where the hollow resonator body 102 and the nozzle body 104 are assembled together, such as in FIGS. 1A and 1B, the hollow resonator body 102 may be fabricated to have (or processed after fabrication to have) an opening in the side wall 102w sized to allow for insertion of the second end 104b of the nozzle body 104. Also or alternatively, the hollow resonator body 102 may have a two-piece or multi-piece construction to facilitate assembly with the nozzle body 104. After assembly, the hollow resonator body 102 and the nozzle body 104 may be bonded together (e.g., via an adhesive or bonding layer) to enhance the mechanical integrity of the assembled subwavelength resonator 100.

Figure 1C:
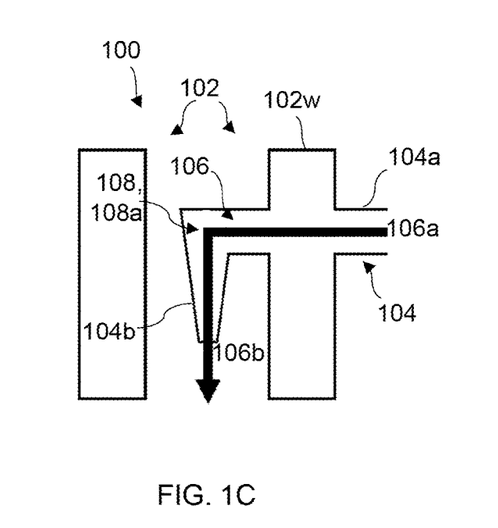
Figure 1D:
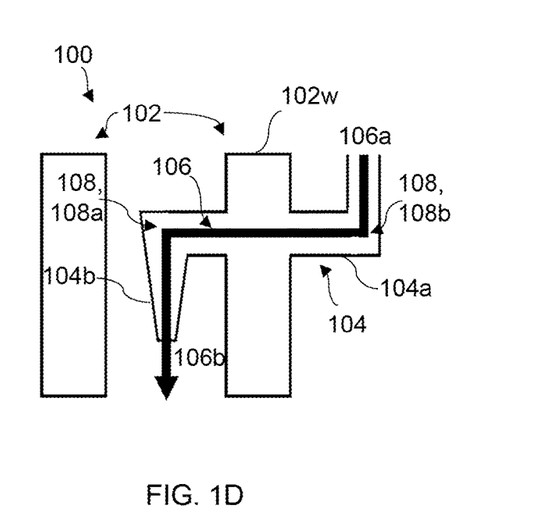

Alternatively, as shown in FIGS. 1C and 1D, the hollow resonator body 102 and the nozzle body 104 may be integrally formed. In other words, the hollow resonator body 102 and the nozzle body 104 may be fabricated together from the same mass or block(s) of material, such that part or all of the hollow resonator body 102 and the nozzle body 104 may be described as a monolithic unit. In one example, the nozzle body 104 and the hollow resonator body 102 may be formed from two microfabricated halves (or wafers), where a first portion of the nozzle body and the hollow resonator body are integrally formed (or formed as a first monolithic unit) from one microfabricated wafer and a second portion of the nozzle body and the hollow resonator body are integrally formed (or formed as a second monolithic unit) from the other microfabricated wafer. It is understood that the two microfabricated halves or wafers need not be identical (e.g., in thickness). After microfabrication, the first and second portions of the nozzle body 104 and the hollow resonator body 102 may be held together by a bonding layer or otherwise attached together. It is also contemplated, as described below, that only the nozzle body 104 may be formed from first and second microfabricated wafers which are then bonded or otherwise attached together, before being integrated with the hollow resonator body 102, which may be separately fabricated.

Since the nozzle body 104 and optionally the hollow resonator body 102 may be formed by microfabrication methods, such as the approach described in greater detail below, the nozzle body 104 and/or the hollow resonator body 102 may comprise any material, e.g., a semiconductor, metal, polymer or ceramic, that is amenable to microfabrication. In the example described below, the nozzle body and/or the hollow resonator body may be formed from two microfabricated halves. Accordingly, in one example, the height $H_h$ of the hollow resonator body 102 may be approximately equal to or less than a total thickness of two semiconductor wafers (e.g., silicon wafers), as discussed further below. Similarly, the second end 104b of the nozzle body 104 may extend a length less than the total thickness of the wafers, such that the ink droplet is emitted within the hollow resonator body 102, where the acoustic field is enhanced. Advantageously, the fluid outlet 106b at the second end of the nozzle body 104 is positioned at a predetermined height within the hollow resonator body 102 to optimize acoustic forces.

The hollow resonator body 102 is configured to achieve a resonant condition that strongly enhances the acoustic field and provides an acoustic force for droplet detachment. Microscale droplets having a diameter less than about 2 mm (or a volume less than about 4 mm$^3$) may be detached. At higher acoustic fields, smaller-size droplets (e.g., droplets having a diameter less than about 200 microns or a volume less than about 0.004 mm$^3$) may be detached. In some cases, droplets having a diameter as small as about 120 microns, or even as small as about 50 microns, may be detached. A lower bound for the droplet diameter may be about 10 microns. Generally speaking, the hollow resonator body 102 can be configured to allow detachment of droplets having diameters in a range from about 10 microns to about 2 mm, where a diameter range of 50 microns to 2 mm, or 100 microns to 2 mm, is more typical. The hollow resonator body 102 may exhibit an extraordinary acoustic field enhancement based on the Fabry-Perot cavity principle.

The hollow resonator body 102 may have an inner width or diameter $d_h$, and a height $H_h$, as indicated in FIG. 1A, where $d_h$ and $H_h$ may be defined in terms of the wavelength λ of the acoustic field. To achieve a resonant condition, $d_h$ and $H_h$ may fall within the following ranges: $0.01\lambda \leq d_h \leq 0.20\lambda$ and $0.30\lambda\ H_h \leq 0.60\lambda$ or $0.80\lambda \leq H_h \leq 1.0\lambda$, according to the related Fabry-Perot resonance. Since the Fabry-Perot resonator may have any cross section (e.g., cylindrical, square, polygonal, ellipsoidal, or irregular, etc.), it is more convenient to refer to its cross-sectional area A. So to achieve a resonant condition, A and $H_h$ may fall within the following range: $\pi/4\cdot(0.01)^2/\lambda^2 \leq A \leq \pi/4\cdot(0.2)^2/\lambda^2$, and $0.30\lambda \leq H_h \leq 0.60\lambda$ or $0.80\lambda \leq H_h \leq 1.0\lambda$, according to the related Fabry-Perot resonance. Typically, the wavelength λ of the acoustic field in air is about 1.4 mm for a system operating at an acoustic frequency of about 250 kHz, and thus, for some embodiments, 14 microns$\leq d_h \leq$280 microns, corresponding to 616 μm$^2$<A<0.2463 mm$^2$, and 420 microns$\leq H_h \leq$840 microns or 1120 microns$\leq H_h \leq$1400 microns. For use at higher frequencies and longer wavelengths, the dimensions of the hollow resonator body 102 may be increased. For example, for a wavelength λ of about 14 mm, $d_h$ and $H_h$ may fall within the following ranges: 0.14 mm$\leq d_h \leq$2.8 mm, corresponding to 0.0616 mm$^2$<A<24.63 mm$^2$, and 4.2 mm$\leq H_h \leq$8.4 mm or 11.2 mm$\leq H_h \leq$14.0 mm. More generally speaking, considering a range of possible wavelengths, 14 microns$\leq d_h \leq$2.8 mm, corresponding to 616 μm$^2$<A<24.63 mm$^2$, and 420 microns$\leq H_h \leq$14.0 mm. To facilitate fabrication of the subwavelength resonator 100 using semiconductor-based microfabrication methods, as described below, it may be advantageous that the hollow resonator body 102 has a height $H_h$ equal to or less than the thickness of two semiconductors wafers, e.g., ≤1,350 μm (≤1.35 mm) for typical 6-inch wafers of about 675 microns in thickness.

It should be noted that, while the figures show the subwavelength resonator 100 as having a longitudinal axis oriented along the z-direction or the vertical direction as defined by gravity, such an orientation is not required. Since the acoustic force generated within the subwavelength resonator 100 may be greater than the force of gravity, ink may be ejected from the hollow resonator body 102 even with a non-vertical (e.g., oblique or horizontal) orientation of the second end 104b of the nozzle body 104 and/or the hollow resonator body 102.

The fluid outlet 106b in the second end 104b of the nozzle body 104 may have a width or diameter in a range from about 1 micron to about 1 mm, and more typically from about 10 microns to about 100 microns. To prevent wetting of the nozzle body 104 by the ink in the vicinity of the fluid outlet 106b during printing, the nozzle body 104 may include a hydrophobic coating and/or another type of surface functionalization at or near the fluid outlet 106b so as to exhibit hydrophobicity, oleophobicity, amphiphobicity, superhydrophobicity, superoleophobicity, and/or superamphiphobicity. Typically, the fluid outlet 106b is substantially centered within the hollow resonator body 102 (e.g., substantially aligned with a longitudinal axis of the hollow resonator body 102) to promote ejection of a droplet having a straight trajectory. If the fluid outlet 106b is off-center, the ejected droplet may move off-axis along a tilted trajectory as it exits the subwavelength resonator 100. If desired, the trajectory of the ejected droplet may be controlled by changing the position of the fluid outlet 106b within the hollow resonator body 102. The first end 104a of the nozzle body 104 may be secured (e.g., by a connector such as a Luer-Lock connector, glue, o-ring and/or gasket) to a tubing, syringe pump or other ink dispenser that is located outside of the apparatus 200,300,400.

Referring again to FIGS. 1A-1D, an outer diameter or width of the second end 104b of the nozzle body 104 may decrease in a direction of the fluid outlet 106b. In other words, the second end 104b of the nozzle body 104 may have a tapered shape, which may provide for a small wall thickness (e.g., between 100 nm and 100 μm, and preferably about 5 μm or less) at the second end 104b of the nozzle body 104 in the vicinity of the fluid outlet 106b; this region of the nozzle body 104 may be referred to as the "nozzle tip." Also or alternatively, in another example of tapering, an outer diameter or width of the second end 104b of the nozzle body 104 may decrease along a longitudinal axis 116 of the nozzle body 104 in a direction away from the fluid inlet 106a, as illustrated in FIG. 6B. In another example, a diameter or width of the fluid channel 106 may decrease in a direction of the fluid outlet 106b; in other words, part or all of the fluid channel 106 may have a tapered shape. Typically the part of the fluid channel 106 that is located in the second end 104b of the nozzle body 104 may benefit from tapering. Generally speaking, the tapering of the nozzle body 104 and/or the fluid channel 106 may be beneficial to ensure that the fluid outlet 106b has a small size (e.g., about 50 microns or less in width or diameter). The tapered shape of the fluid channel 106 and/or the second end 104b of the nozzle body 104, as shown in FIGS. 1A-1D, may be a linearly tapered shape. Alternatively, for ease of fabrication, the tapering may be achieved by a step-function decrease in the outer width or diameter of the second end 104b of the nozzle body 104, and/or in the width or diameter of part or all of the fluid channel 106, in the direction of the fluid outlet 106b.

As indicated above in reference to FIG. 3 or 4, the apparatus 300,400 may be partially or fully enclosed by the sound-reflecting walls 114. Advantageously, the apparatus 300,400 includes at least two or at least three sound-reflecting walls 114 and as many as six or more sound-reflecting walls 114. The sound-reflecting walls 114 may be formed of any of a number of solid materials, including metals, ceramics, polymers, natural fiber materials (e.g., wood, paper), plaster, and others. The apparatus 400 may have a rectangular parallelepiped shape, as shown for example in FIG. 4, or the apparatus may have another elongated shape, such as a cylindrical shape. In such a case, sound-reflecting top and bottom walls may be portions of a single curved surface.

The apparatus 200,202,300,400 may include a fluid medium, i.e., a gas or liquid such as ambient air, water or oil, which can transmit sound waves. The apparatus 200,202, 300,400 may be immersed in the fluid medium. In some cases, the fluid medium may be forced through the acoustic chamber 200,300,400 at a constant or variable flow rate.

To increase throughput, the apparatus 200,300,400 described above according to various embodiments may include a number (plurality) of the subwavelength resonators 100. For example, referring to FIG. 2B, the subwavelength resonators 100 may be spaced apart along a width or length of the apparatus 202 (e.g., across the page). The subwavelength resonators may also or alternatively be spaced apart along a depth of the apparatus (e.g., into the page). Thus, the subwavelength resonators 100 may have a 1D or 2D arrangement relative to the substrate 112. Also or alternatively, at least one of the subwavelength resonators 100 may include a plurality of the nozzle bodies 104. In other words, a number of nozzle bodies 104 may be integrated with (assembled with or integrally formed with) a single hollow resonator body 102, where each of the nozzle bodies 104 has a first end 104a outside the hollow resonator body 102 and a second end 104b inside the hollow resonator body 102.

A method of acoustophoretic printing is also described. The method comprises providing an apparatus including an acoustic emitter and a subwavelength resonator, where the subwavelength resonator comprises a hollow resonator body for local enhancement of an acoustic field integrated with (e.g., assembled with or integrally formed with) a nozzle body for delivery of an ink into the acoustic field. The subwavelength resonator comprises, as discussed above in reference to FIGS. 1A-1D, a hollow resonator body and a nozzle body having a first end outside the hollow resonator body and a second end inside the hollow resonator body. The nozzle body comprises a fluid channel extending between a fluid inlet at the first end and a fluid outlet at the second end, and the fluid channel passes through a side wall of the hollow resonator body and includes at least one bend. The acoustic emitter is activated to generate an acoustic field, which is transmitted to the subwavelength resonator and enhanced in the hollow resonator body, such that a high intensity acoustic field is formed at the fluid outlet. An ink is delivered through the fluid channel to the fluid outlet, where the ink is exposed to the high-intensity acoustic field and detached from the nozzle body. As discussed above, the hollow resonator body may achieve a resonant condition that strongly enhances the acoustic field and provides an acoustic force to facilitate detachment of an ink droplet. Thus, a predetermined amount of ink may be ejected from the fluid outlet. The method may utilize a subwavelength resonator as described according to any embodiment or example in this disclosure. The apparatus may further include a substrate facing the fluid outlet for deposition of the ink after detachment. During acoustophoretic printing, the substrate may be moved relative to the subwavelength resonator, e.g., at a speed of 0.1 mm/s to 1 m/s.

The acoustic field may further be modulated in order to alter the acoustic force on the ink droplet, which may be referred to as a pendant droplet prior to detachment. The modulation may comprise modulating the frequency and/or amplitude of acoustic waves from the acoustic emitter, thereby altering the acoustophoretic force on the pendant droplet, e.g., as described in International Patent Publication No. WO 2019/212845 to Foresti and Lewis, entitled "Modulation of Acoustophoretic Forces in Acoustophoretic Printing," which is hereby incorporated by reference in its entirety.

The nozzle body 104 and/or the subwavelength resonator 100 may be fabricated using any of a number of existing microfabrication technologies, including 3D printing, two-photon polymerization lithography (e.g., "Nanoscribe"), micromachining, polymer micromolding, metal deposition, glass etching and semiconductor-based microfabrication.

An exemplary semiconductor-based microfabrication approach for fabricating the subwavelength resonator is described in detail below. In these examples, silicon wafers are employed, although other types of semiconductor wafers (Ge, GaAs, etc.) may also be suitable. The silicon wafers are 6-inch, double-side-polished p-type (100) wafers, with a resistivity of $1^{-10}$ $\Omega$cm, and a thickness of 675±25 μm. Double-side-polished wafers are preferred since the wafers are patterned from both sides.

Fabrication Example

Figure 5:
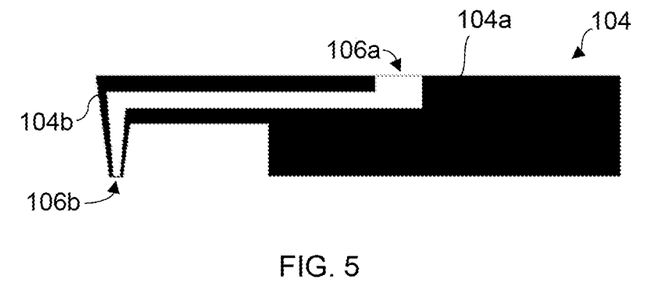
FIG. 5 is a cross-sectional schematic of an exemplary nozzle body design.

FIG. 5 shows an exemplary design of a microfabricated nozzle body. During acoustophoretic printing, ink flows through the nozzle body 104 from the fluid inlet 106a at the first end 104a to the fluid outlet 106b at the second end 104b of the nozzle body 104. The fluid inlet 106a is situated outside the hollow resonator body 102 (not shown in this figure; see FIG. 6A) for connection to external tubing, a syringe pump, or other ink source for delivery of the ink. In a preferred design, the second end 104b is tapered in a direction of the fluid outlet 106b and/or may be centered within the hollow resonator body 102.

Figure 6A:
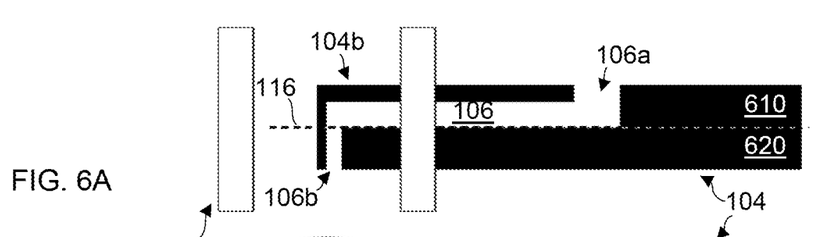
FIGS. 6A and 6B are cross-sectional and top view schematics of a nozzle body integrated with a hollow resonator body, where the nozzle body has a design amenable to microfabrication.
Figure 6B:
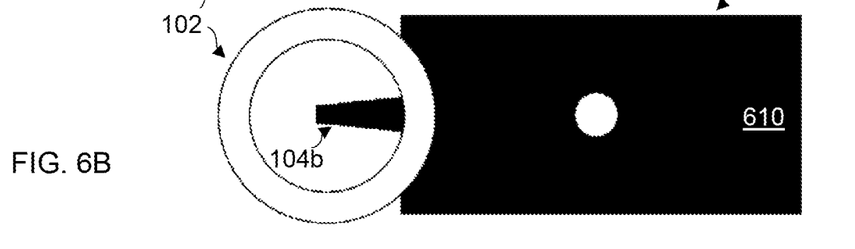
Figure 7:
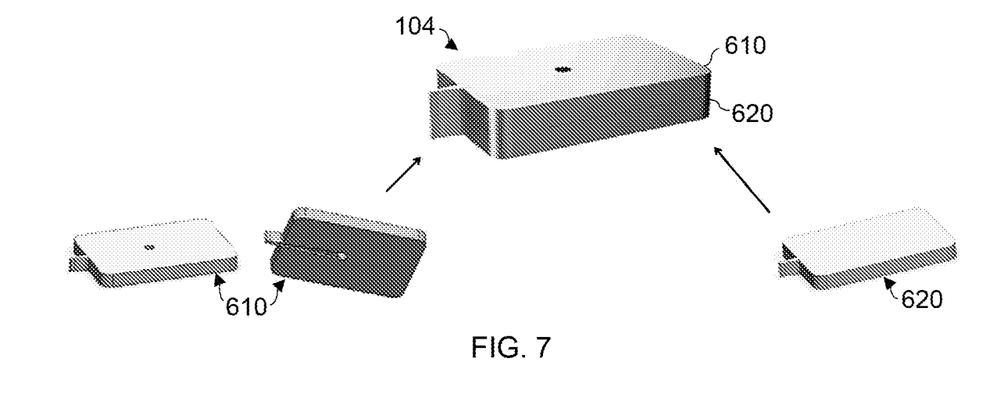
FIG. 7 shows a three-dimensional view of a nozzle body assembled and bonded from first and second microfabricated halves.

FIGS. 6A and 6B show a simplified geometry of the nozzle body 104 integrated with a separately fabricated hollow resonator body 102. In this exemplary design, a bottom surface of the nozzle body 104 is flat and conformal, and the second end 104b is tapered along a longitudinal axis 116 of the nozzle body 104, as shown in FIG. 6B, but is not tapered in the direction of the fluid outlet 106b. Such a geometry may be more amenable to microfabrication than the optimal design shown in FIG. 5. As described above, this fabrication approach comprises splitting the design into two parts, such that the fluid channel 106 (at least, the length of the fluid channel extending along the longitudinal axis 116 of the nozzle body 104) and the fluid inlet 106a may be fabricated from a first wafer or first microfabricated half 610, and the fluid outlet 106b may be fabricated from a second wafer or second microfabricated half 620. The final nozzle body 104 may then be assembled from these two individually fabricated parts 610,620, as illustrated in FIG. 7.

The fluid channel 106, inlet 106a and outlet 106b, as well as the outlines of the nozzle body 104, are fabricated by deep reactive ion etching (DRIE), as described below in reference to FIGS. 8A-8D and FIGS. 9A-9D. The wafers are then carefully aligned using alignment methods known in the art. Finally, the two wafers are bonded together. Suitable bonding methods may include silicon direct (or fusion) bonding, adhesive polymer bonding, metal diffusion bonding, eutectic bonding, and/or hybrid bonding, which combines metal-to-metal bonding and wafer bonding with organic adhesives. In this example, metal diffusion bonding is employed.

Figures 8A, 8B, 8C, 8D:
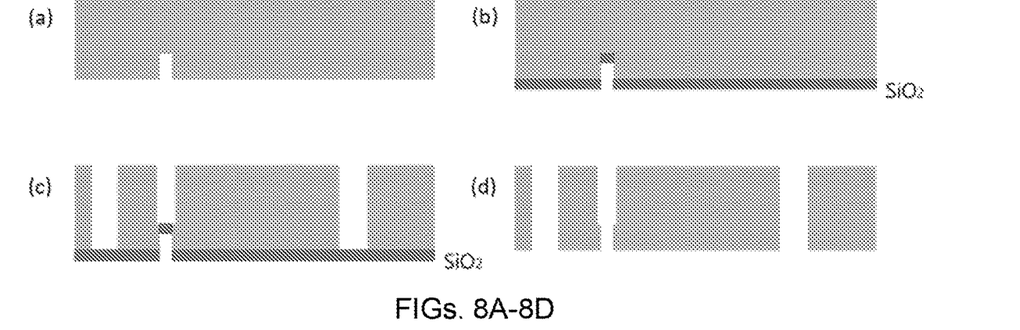
FIGS. 8A-8D show exemplary microfabrication steps for the second microfabricated half of FIGS. 6A and 7.

Exemplary fabrication steps for the second wafer 620 are schematically shown in FIGS. 8A-8D. In the first step (FIG. 8A), the fluid outlet is etched from the bottom side of the second wafer to around 200 μm in depth. An oxide layer (e.g., $SiO_2$ layer of about 2.5 μm in thickness) is then grown at low temperature on the bottom side of the second wafer, as shown in FIG. 8B. Chemical vapor deposition may be employed. The fluid inlet (e.g., about 95 μm) and the outlines of the nozzle body are then etched simultaneously until the oxide layer is reached, as shown in FIG. 8C. The oxide layer is finally removed in a buffered oxide etch (BOE) (e.g., 7:1 BOE for 30 min), as illustrated in FIG. 8D.

Figures 9A, 9B, 9C, 9D:
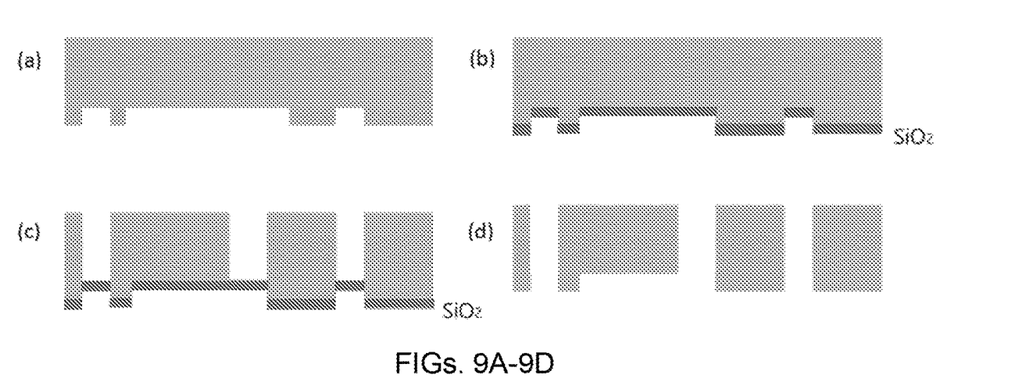
FIGS. 9A-9D show exemplary microfabrication steps for the first microfabricated half of FIGS. 6A, 6B and 7.

Exemplary fabrication steps for the first wafer 610 are schematically shown in FIGS. 9A-9D. In the first step (FIG. 9A), the fluid channel and nozzle body outlines are etched to about 100 μm in depth. An oxide layer (e.g., $SiO_2$ layer of about 2.5 μm in thickness) is then grown on the bottom side of the first wafer 610 in a CVD process, as shown in FIG. 9B. The nozzle body outlines and fluid inlet are then etched from the top side, as illustrated in FIG. 9C. In a final step, the oxide layer is removed by BOE (e.g., 7:1 BOE), as shown in FIG. 9D.

As would be appreciated by the skilled artisan, the above-described etching process may be modified so as to integrally form the nozzle body and the hollow resonator body. In such a case, the nozzle body 104 and the hollow resonator body 102 may be formed from two microfabricated halves (i.e., the first and second wafers 610,620) as described above for the nozzle body alone, where a first portion of the nozzle body and the hollow resonator body are integrally formed (or formed as a first monolithic unit) from one microfabricated half and a second portion of the nozzle body and the hollow resonator body are integrally formed (or formed as a second monolithic unit) from the other microfabricated half.

Bonding may entail depositing metal layers (e.g., a titanium adhesion layer followed by a gold layer) on the bonding surfaces, that is, on a bottom surface of the first wafer 610 and a top surface of the bottom wafer 620, followed by aligning of the first and second wafers 610,620, and bonding under vacuum conditions at an elevated temperature (e.g., 350-500° C.) for a suitable time duration (e.g., 30 min to 2 hours) to form the nozzle body 104.

Figure 10A:
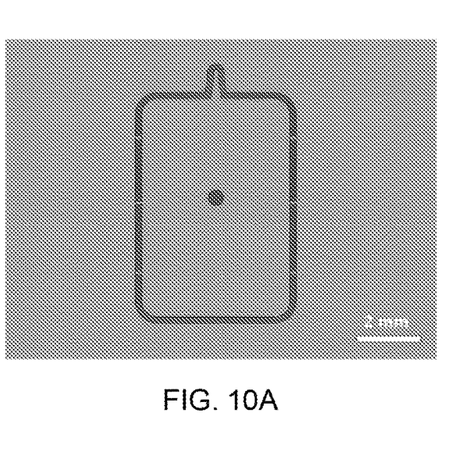
FIGS. 10A and 10C show a fabricated nozzle body prior to and after, respectively, being detached from the wafer stack.
Figure 10B:
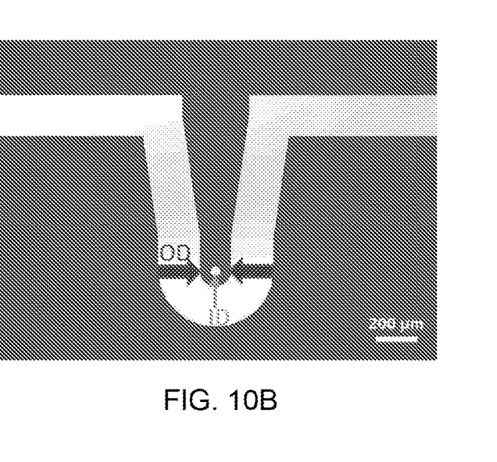
FIG. 10B shows a close-up view of the fluid outlet from a bottom side of the nozzle body.
Figure 10C:
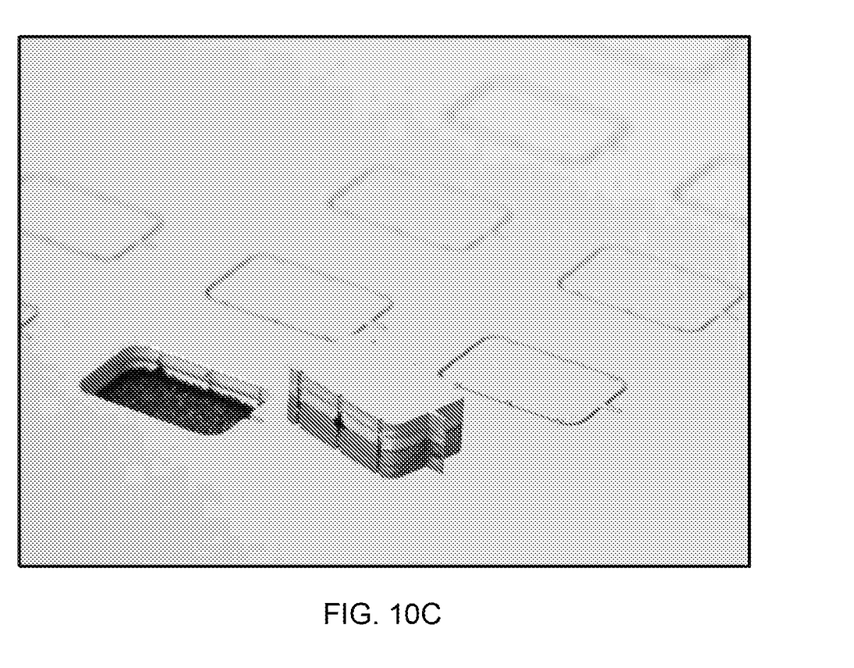

A detachment mechanism may be integrated into the nozzle body fabrication process to avoid a final dicing step. As described above, the outlines of the nozzle body are etched simultaneously with the nozzle features (the fluid channel, inlet and outlet), where the fluid outlet may be significantly smaller than the nozzle body outlines (e.g., about 60 μm in diameter versus about 200 μm in width). Referring now to FIG. 10A, the nozzle body outlines may be etched so that thin (e.g., 100 μm wide) side-bridges are kept in-between the nozzle body and the wafers. After the bonding is performed, the completed nozzle bodies may be popped-out of the wafer stack, without the need for dicing. FIG. 10B shows a close-up view of the fluid outlet from the bottom side of the nozzle body, and FIG. 10C shows a view of a fabricated nozzle body popped out of first and second bonded-together wafers.

Although the present invention has been described in considerable detail herein and in the appendices with reference to certain embodiments thereof, other embodiments are possible without departing from the present invention. The spirit and scope of the appended claims should not be limited, therefore, to the description of the preferred embodiments contained herein. All embodiments that come within the meaning of the claims, either literally or by equivalence, are intended to be embraced therein.

Furthermore, the advantages described above are not necessarily the only advantages of the invention, and it is not necessarily expected that all of the described advantages will be achieved with every embodiment of the invention.

The invention claimed is:

1. A subwavelength resonator for acoustophoretic printing, the resonator comprising:
   a hollow resonator body for local enhancement of an acoustic field; and
   a nozzle body integrated with the hollow resonator body for delivery of an ink into the acoustic field, the nozzle body having a first end outside the hollow resonator body and a second end inside the hollow resonator body, the nozzle body comprising a fluid channel extending between a fluid inlet at the first end and a fluid outlet at the second end, the fluid channel passing through a side wall of the hollow resonator body and including at least one bend.

2. The subwavelength resonator of claim 1, wherein the nozzle body and the hollow resonator body are assembled together.

3. The subwavelength resonator of claim 1, wherein the nozzle body and the hollow resonator body are integrally formed.

4. The subwavelength resonator of claim 1, wherein the at least one bend in the fluid channel includes a first bend disposed in the hollow resonator body.

5. The subwavelength resonator of claim 4, wherein the first bend comprises a 90° angle.

6. The subwavelength resonator of claim 4, wherein the at least one bend in the fluid channel includes a second bend disposed outside the hollow resonator body, the second bend being closer to the fluid inlet than the first bend.

7. The subwavelength resonator of claim 1, wherein the nozzle body comprises two microfabricated halves.

8. The subwavelength resonator of claim 7, wherein the hollow resonator body and the nozzle body comprise the two microfabricated halves.

9. The subwavelength resonator of claim 1, wherein an outer diameter or width of the second end of the nozzle body decreases in a direction of the fluid outlet, the second end of the nozzle body thereby comprising a tapered shape.

10. The subwavelength resonator of claim 1, wherein an outer diameter or width of the second end of the nozzle body decreases along a longitudinal axis of the nozzle body in a direction away from the fluid inlet, the second end of the nozzle body thereby comprising a tapered shape.

11. The subwavelength resonator of claim 1, wherein a diameter or width of the fluid channel decreases in a direction of the fluid outlet.

12. The subwavelength resonator of claim 1, wherein the fluid outlet at the second end of the nozzle body is positioned at a predetermined height within the hollow resonator body to optimize acoustic forces.

13. The subwavelength resonator of claim 1, further comprising a plurality of the nozzle bodies, each of the nozzle bodies having a first end outside the hollow resonator body and a second end inside the hollow resonator body.

14. An apparatus for acoustophoretic printing comprising:
an emitter for generating the acoustic field, the emitter facing an inlet end of the subwavelength resonator of claim 1; and
a substrate for deposition of an ink, the substrate facing an outlet end of the subwavelength resonator.

15. The apparatus of claim 14, further comprising one or more sound reflecting walls for transmission of the acoustic field between the emitter and the subwavelength resonator.

16. The apparatus of claim 14, further comprising a plurality of the subwavelength resonators, the subwavelength resonators having a 1D or 2D arrangement relative to the substrate.

17. A method of acoustophoretic printing, the method comprising:
providing an apparatus including an acoustic emitter and a subwavelength resonator for enhancing an acoustic field, the subwavelength resonator comprising:
a hollow resonator body; and
a nozzle body integrated with the hollow resonator body, the nozzle body having a first end outside the hollow resonator body and a second end inside the hollow resonator body, the nozzle body comprising a fluid channel extending between a fluid inlet at the first end and a fluid outlet at the second end, the fluid channel passing through a side wall of the hollow resonator body and including at least one bend;
activating the acoustic emitter to generate an acoustic field, the acoustic field being transmitted to the subwavelength resonator and being enhanced in the hollow resonator body, thereby forming a high intensity acoustic field at the fluid outlet; and
delivering an ink through the fluid channel to the fluid outlet, a predetermined volume of the ink being detached from the nozzle body in the high intensity acoustic field.

18. The method of claim 17, further comprising a substrate facing the fluid outlet for deposition of the ink.

19. The method of claim 17, wherein the at least one bend in the fluid channel includes a first bend disposed in the hollow resonator body.

20. The method of claim 19, wherein the at least one bend in the fluid channel includes a second bend disposed outside the hollow resonator body, the second bend being closer to the fluid inlet than the first bend.

* * * * *